United States Patent [19]

Lautenschläger

[11] Patent Number: 5,487,610
[45] Date of Patent: Jan. 30, 1996

[54] WHEEL FOR ROLLER DRAWER GUIDES

[75] Inventor: Horst Lautenschläger, Reinheim, Germany

[73] Assignee: MEPLA-Werke Lautenschläger GmbH & Co. KG, Germany

[21] Appl. No.: 374,516

[22] PCT Filed: Apr. 29, 1994

[86] PCT No.: PCT/EP94/01375

§ 371 Date: Jan. 18, 1995

§ 102(e) Date: Jan. 18, 1995

[87] PCT Pub. No.: WO94/26147

PCT Pub. Date: Nov. 24, 1994

[30] Foreign Application Priority Data

May 18, 1993 [DE] Germany ............... 9307532 U

[51] Int. Cl.[6] ............................................ A47B 88/00
[52] U.S. Cl. ............................................ 384/19; 384/54
[58] Field of Search .................... 384/19, 50, 54, 384/58, 449, 549; 312/334.12, 334.18, 334.25, 334.26, 334.33, 334.36–334.43

[56] References Cited

U.S. PATENT DOCUMENTS 2,873,150  1/1955  Hutzelman ...................... 384/19
3,464,744  9/1969  Fall .................................. 384/19
4,639,145  1/1987  Lautenschlager ................ 384/19
5,169,237  12/1992  Domenig ......................... 384/19

FOREIGN PATENT DOCUMENTS

| 395098 | 9/1992 | Austria. | |
| 7129122 | 7/1971 | Germany. | |
| 2043223 | 3/1972 | Germany. | |
| 3432245 | 3/1985 | Germany | 312/334.18 |
| 3507821 | 11/1986 | Germany. | |
| 3536654 | 4/1987 | Germany | 312/334.12 |
| 3910934 | 10/1990 | Germany. | |
| 4114454 | 11/1992 | Germany. | |

*Primary Examiner*—Thomas R. Hannon

[57] ABSTRACT

Wheel (10) for roller guides for drawers in furniture, having a wheel body (12) made of a shape-stable hard plastic which has a circumferential groove-like opening (28) in the rim with at least one recess and having a tire (20) of resilient material, preferably an elastomeric plastic protruding above the rim of the wheel body. The plastic is injected in fluid form into the groove-like opening (28) with the recess or recesses and in its elastically deformable final state it conforms to the groove-like opening and recess(es). In a side surface of the wheel body (12) an open-mouthed annular groove (26) is provided and the recess(es) issuing from the circumferential, groove-like opening (28) for the integrated tire (20) is (are) configured as a passage (22) going all the way to the annular groove (26).

6 Claims, 2 Drawing Sheets

WHEEL FOR ROLLER DRAWER GUIDES

The invention relates to a wheel for roller drawer guides for extractable furniture parts, with a wheel body made from a hard plastic of stable shape mounted for rotation on an axle, the wheel body having a circumferential slot or groove in the wheel body with at least one recess, and having a tire of resilient material, preferably an elastomeric plastic, extending slightly beyond the wheel body's circumference, which is injected in fluid form into the slot with the at least one recess and which, in its resilient solid state, fills the slot and the at least one recess.

For some time it has been common practice, in the case of roller drawer guides, to equip the wheels with tires to damp the rumble created when the wheels run on the guide rails and runner rails. These tires were originally made separately in the form of elastic O-rings and mounted on the wheels. These separate tires, however, could stretch in the course of time, slip, and then sometimes jam the drawer guide.

To avoid this disadvantage, German Patent 39 10 934A1 has disclosed a wheel with an integrated tire of resilient material, preferably elastomeric plastic, which is injected in fluid form into recesses provided for this purpose on the wheel, and in its final resilient state the tire is seated on the wheel body such that any loosening or displacement of the tire on the wheel is effectively prevented. In German Patent 39 10 934A1 the configuration of the wheel is made such that the wheel body has a circumferential slot in its rim in which the tire of resilient material protruding slightly beyond the rim of the wheel body is disposed, and that in at least one of the confronting lateral surfaces and/or in the circumferential bottom surface of the slot at least one, preferably several, recesses are provided, in which the material of the tire injected in fluid form and then converted to the resilient state also is fitted, and that furthermore, in a side wall of the slot there is created at least one bore for the injection of the tire material, which terminates at the other end inside of the slot. In the manufacture of this known wheel it is necessary to align precisely the bores for injecting the tire material, and with them the entire injection mold, with the nozzles that inject the tire material. This considerably complicates manufacture.

The present invention is therefore addressed to the problem of improving the known wheel so that the wheel on the one hand and the integrated tire of elastic material on the other can be manufactured as simply and inexpensively as possible in two successive injection molding processes.

Setting out from a wheel of the kind described above, this problem is solved in accordance with the invention in that an annular groove is provided in one lateral surface of the wheel body, and that the recess or recesses for the integrated tire are in the form of at least one passage leading into the annular groove. By providing an annular groove in a lateral surface of the wheel body instead of the injection bores, the tire material can be injected independently of the position of the injection molding mold with respect to the axis of rotation, i.e., the axle. The still fluid tire material then distributes itself from the annular groove through the passage or passages to the circumferential slot whose periphery is closed off during the injection process by a part of the mold which completely surrounds it. Preferably the passage or passages run from the bottom of the circumferential slot.

To enable the still fluid tire material to be distributed as easily as possible, it is expedient to provide several, preferably four, passages between the annular groove and the circumferential slot, and to distribute them so that they run from the slot at equal intervals.

Particularly in case a plurality of passages are provided, they should run in the opening direction of the parts of the wheel body injection molding mold which form the slot, and should be shaped so that they do not have any undercuts interfering with the opening of the die.

In a preferred embodiment of the invention, the annular groove is disposed in a circular recess within the lateral wall of the wheel body, so that the depth of the annular groove that is necessary for connection to the passages lying in the plane of the tire can be kept shallow.

The invention will be further explained below with the aid of an embodiment in conjunction with the drawing, wherein.

Figure 1:
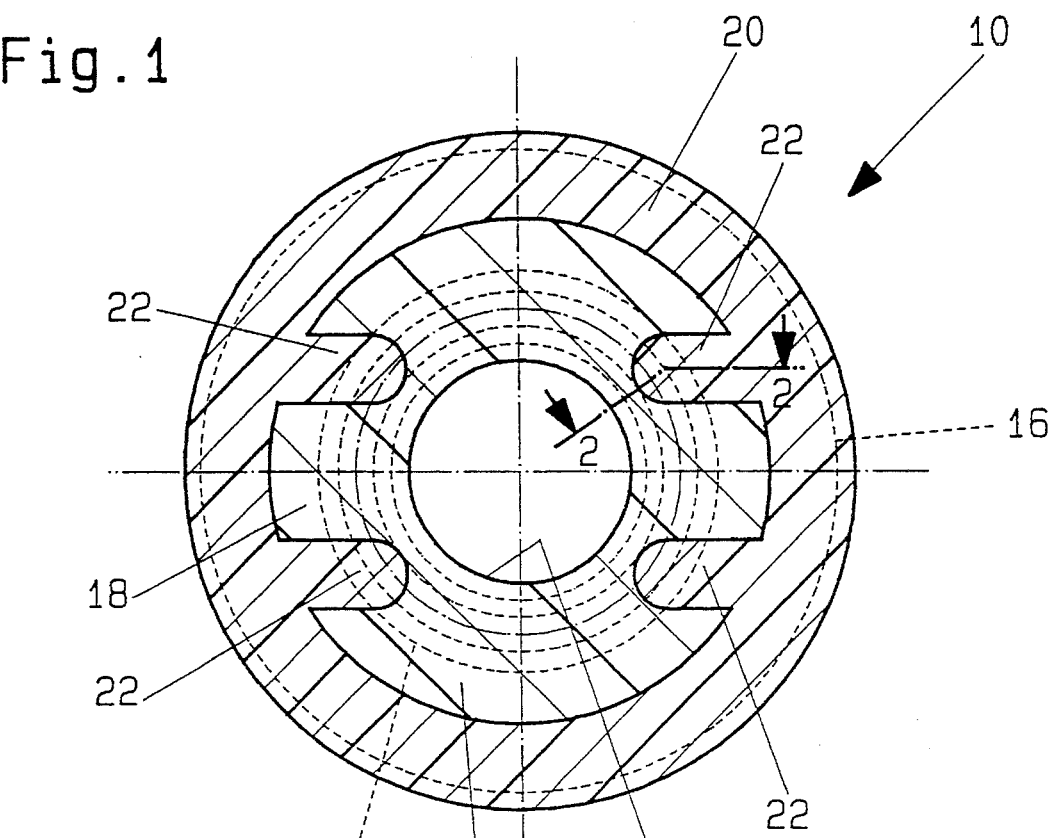
FIG. 1 is a sectional view through the wheel body and its tire in the plane of the finished wheel, perpendicular to the axle.

The wheel 10 shown in FIG. 1 has a hard body 12 made by injection molding from an appropriate shape-stable plastic, which is in the form of a relatively thick circular disk and is provided with a central bore 14 which forms the bearing bore for the rotatable mounting of the wheel body 12 on a stub shaft, not shown, affixed to the runner rail or guide rail of a drawer guide. In the rim 16 of the wheel body there is formed a circumferential groove running in depth from the rim 16 to the bottom 18 of the groove. This circumferential groove is filled by a tire 20 of a resilient material—preferably an elastomeric plastic—which projects slightly above the rim 16 of the wheel body 12, so that the wheel 10 rolls mainly on the tire 20 and not on the wheel 12 itself.

Figure 2:
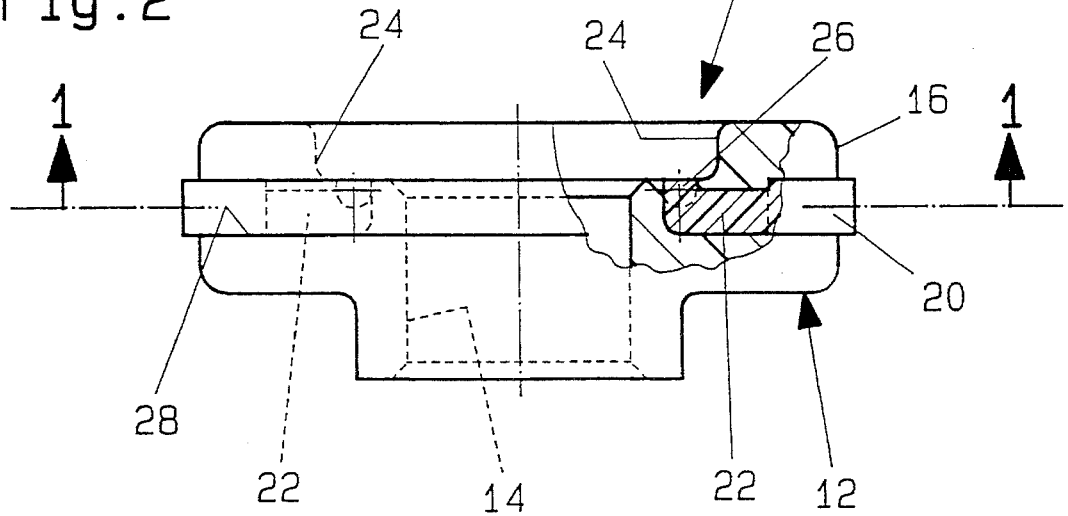
FIG. 2 is an elevational view of the tread of the wheel, in which the resilient tire is represented in section in the cut-away area at the junction between the passage and the annular groove.

Four passages 22 extend in the present embodiment from the bottom 18 of the groove. The passages 22 all run in the direction in which the injection molding mold opens, and lead, as shown in FIG. 2, into an annular groove 26 disposed in a circular recess 24 in one side of the wheel body 12.

The tire 20 is created by injecting the tire material in the fluid state through an injection nozzle—not shown here—of appropriate shape placed against the annular groove 26. Thus the wheel body 12 is held in a mold that surrounds it on all sides, in which, in the area of the rim 16 of the wheel body 12, circumferential groove is formed into which the injected material enters and thus also forms the portion of the tire 20 that is raised radially above the rim 16. The completed tire 20 lastly fills the slot 28, the passages 22 and the annular groove 26. In this manner the resilient material in the annular groove 26 is joined to the material in the slot 28 in the manner of a web by the material in the passages 22, which securely prevents any loosening or displacement of the tire. The material of the tire can be either a thermoplastic in the heated state which after cooling has the desired resiliency, or an elastomer made from two liquid components combined immediately before the injection, the crosslinking being accelerated by the input of heat through the heated mold.

Figure 3:
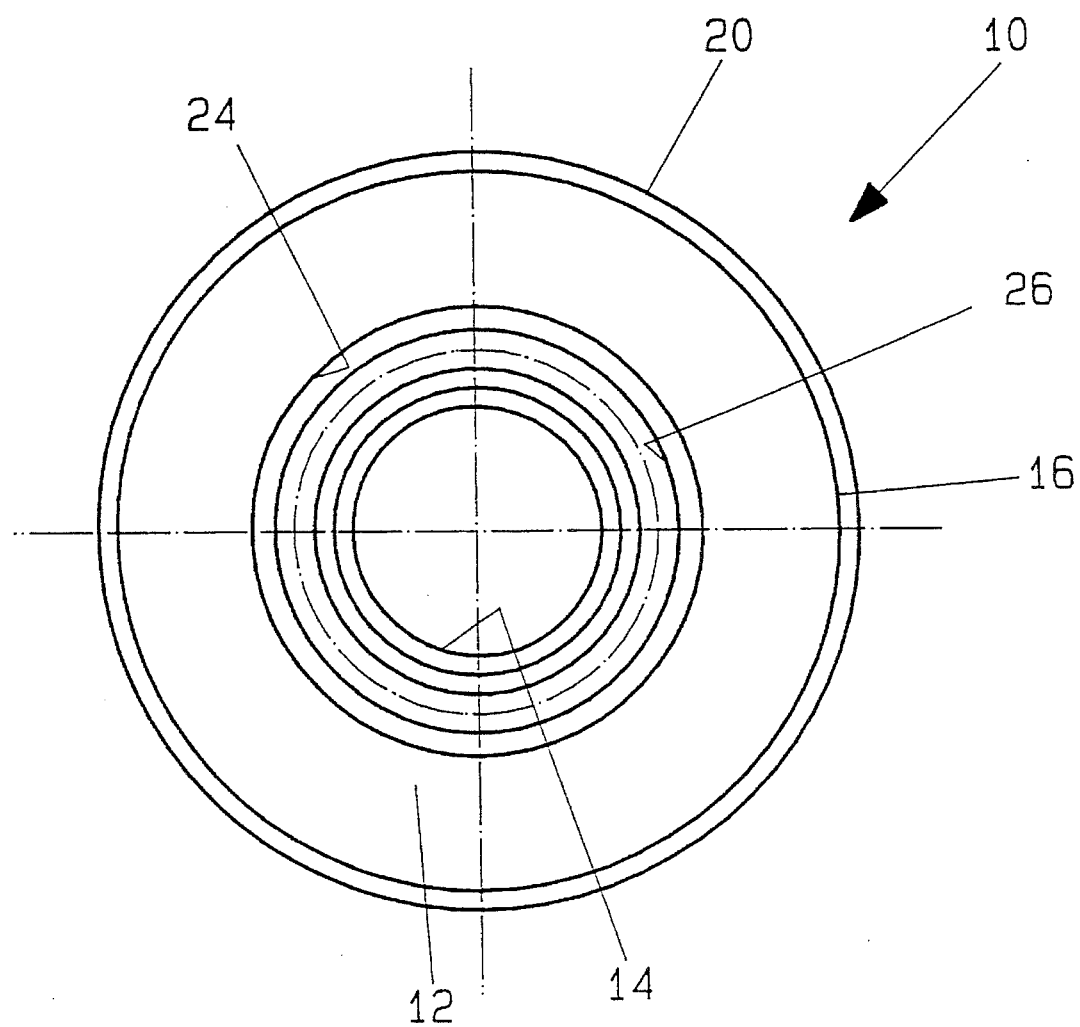
FIG. 3 is an elevation of the side of the wheel in which the annular groove is formed.

FIG. 3 shows a view of the wheel from the side, in which is shown the arrangement of the annular groove 26 within the circular recess 24 in the illustrated side of the wheel 12.

I claim:

1. A wheel for roller drawer guides for extractable furniture parts, having a wheel body of stable shape mountable for rotation on an axle, which wheel body has a circumferential groove the circumferential groove having at least one recess, and a tire of elastically deformable material projecting slightly outward of the circumference of the wheel body, which tire is formed in the groove in a fluid state, wherein an annular groove opens from a lateral surface of the wheel body and the recess is formed as at least one passage running from the circumferential groove to the annular groove.

2. A wheel according to claim 1 wherein the at least one passage sets out from the bottom surface of the circumferential groove.

3. A wheel according to claim 1 wherein four passages are provided.

4. A wheel according to claim 3 wherein the four passages are parallel.

5. A wheel according to claim 1 wherein the at least one passage is oriented in the opening direction of a wheel body injection mold and is shaped such that it forms no undercut interfering with the opening of the mold.

6. A wheel according to claim 1 wherein the annular groove is disposed in a disk-shaped recess within the lateral surface of the wheel body.

\* \* \* \* \*